United States Patent [19]

Kaneko et al.

[11] Patent Number: 4,854,194
[45] Date of Patent: Aug. 8, 1989

[54] STARTING SPEED STAGE SELECTOR IN AUTOMATIC TRANSMISSION CONTROL SYSTEM

[75] Inventors: Kiyoshi Kaneko, Kawasaki; Yoshiaki Kato, Fuchu, both of Japan

[73] Assignee: Kabushiki Kaisha Komatsu Seisakusho, Tokyo, Japan

[21] Appl. No.: 150,367

[22] PCT Filed: May 7, 1987

[86] PCT No.: PCT/JP87/00281

§ 371 Date: Mar. 1, 1988

§ 102(e) Date: Mar. 1, 1988

[87] PCT Pub. No.: WO87/06988

PCT Pub. Date: Nov. 19, 1987

[30] Foreign Application Priority Data

May 8, 1986 [JP] Japan .................. 61-105146

[51] Int. Cl.⁴ ............................. B60K 41/06
[52] U.S. Cl. ............................ 74/866; 74/862
[58] Field of Search ............... 74/862, 866; 364/424.1

[56] References Cited

U.S. PATENT DOCUMENTS

| | | | |
|---|---|---|---|
| 3,640,156 | 2/1972 | Mori et al. | 74/866 |
| 3,680,410 | 8/1972 | Sumiyoshi et al. | 74/866 |
| 3,713,351 | 1/1973 | Sakakibara et al. | 74/866 X |
| 3,876,028 | 4/1975 | Asano et al. | 74/866 X |
| 4,282,780 | 8/1981 | Totani et al. | 74/866 |
| 4,285,252 | 8/1981 | Yamaki et al. | 74/866 |
| 4,518,068 | 5/1985 | Oguma et al. | 192/0.052 |
| 4,564,906 | 1/1986 | Stephan et al. | 364/424.1 |
| 4,630,508 | 12/1986 | Klatt | 74/862 X |
| 4,648,291 | 3/1987 | Klatt et al. | 74/866 |
| 4,671,138 | 6/1987 | Nobumoto et al. | 74/862 |
| 4,713,764 | 12/1987 | Klatt | 74/866 X |

FOREIGN PATENT DOCUMENTS

| | | |
|---|---|---|
| 0006033 | 12/1979 | European Pat. Off. |
| A/3334719 | 4/1985 | Fed. Rep. of Germany |
| 41425 | 10/1977 | Japan |
| 41426 | 10/1977 | Japan |
| 131430 | 9/1985 | Japan |
| 49087 | 12/1986 | Japan |
| WO-/A8602112 | 4/1986 | PCT Int'l Appl. |

Primary Examiner—Dwight G. Diehl
Attorney, Agent, or Firm—Diller, Ramik & Wight

[57] ABSTRACT

A starting speed stage selector for starting a vehicle at all times from an optimum speed stage in response to load conditions of the vehicle. The selector is employed in an automatic transmission control system in which a speed of a transmission having preset speed stages is shifted up or down sequentially on a step-by-step basis in response to the load conditions. The speed stage selector selects one of the present speed stages optimum for starting the vehicle in response to the vehicle load conditions and a road surface gradient.

15 Claims, 4 Drawing Sheets

STARTING SPEED STAGE SELECTOR IN AUTOMATIC TRANSMISSION CONTROL SYSTEM

TECHNICAL FIELD

The present invention relates to an automatic transmission control system for such a vehicle as a dump truck and, more particularly, to a starting speed stage selector which is used in such a transmission control system to select an optimum speed stage of a vehicle for starting a vehicle.

BACKGROUND ART

In general, an automatic transmission control system for a vehicle is arranged to shift the speed of a transmission up or down to optimum one of preset speed stages sequentially on a step-by-step basis in accordance with the load condition of the vehicle (such as, for example, the vehicle speed or engine rotational speed).

In prior art automatic transmission control systems of the type referred to, however, when a transmission lever is set at a shift position D (drive position) with speed stages ranging from a forward 2 speed position to a forward 7 speed position (F2 to F7) and it is desired to start a vehicle, the vehicle must be started always from the position F2 and be shifted up in speed on a step-by-step basis in a sequential order of F2, F3, F4, ... and up to the optimum speed stage, which disadvantageously results in that the system requires the large number of shift times, with poor start/acceleration characteristics and considerable speed shift shock.

In view of the above circumstances, it is an object of the present invention to provide a starting speed stage selector which is used in an automatic transmission control system to allow a vehicle to start always from an optimum speed stage in response to load conditions of the vehicle.

DISCLOSURE OF INVENTION

The present invention is featured by comprising means for detecting a start mode of a vehicle, means for detecting loaded conditions of the vehicle, means for detecting an incline angle of the vehicle with respect to a front and rear direction, means for selecting optimum one of the speed stages in a start mode of the vehicle on the basis of outputs of the load condition detecting means and the incline angle detecting means, and speed control means for controllably changing the speed stage of a transmission to the optimum speed selected by the starting-speed-stage selecting means in the start mode of the vehicle when the start mode detecting means detects the start mode.

That is, the present invention is arranged to measure the load conditions of the vehicle at the time of starting the vehicle on the basis of a road surface gradient, a carried load or cargo condition and so on, to select an optimum speed stage (a speed stage providing the best start/acceleration characteristics) in response to the measured load conditions, and to start the vehicle from the selected speed stage.

In accordance with such an arrangement of the present invention, the number of speed shift times, especially, under a low load condition can be reduced and good start/acceleration properties can be obtained. In addition, torque variations, which would tend to take place at low speed stages, can be made small and speed shift shock can be avoided.

BEST MODE FOR CARRYING OUT THE INVENTION

The present invention will be detailed by referring to attached drawings.

Figure 1:
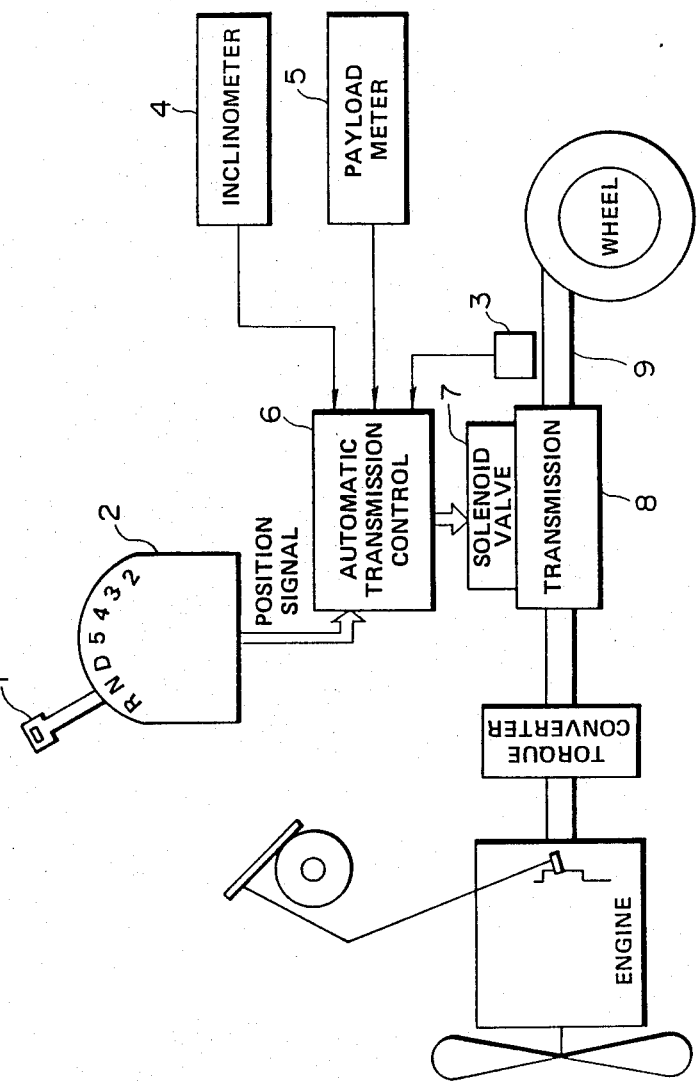
FIG. 1 is an arrangement showing an embodiment of an automatic transmission control system including a starting speed stage selector of the present invention.

Referring first to FIG. 1, there is shown an arrangement of an automatic speed change gear or transmission control system including a starting speed stage selector of the present invention, in which system a transmission lever 1 is used to select one of speed shift positions (R, N, D, 5, 4, 3 and 2) and a shift position sensor 2 is to send to an automatic transmission control unit 6 a position signal indicative of one of the shift positions selected by the transmission lever 1.

A rotation sensor 3 functions to detect the rotational speed of an output shaft 9 of a transmission 8 and to apply to the control unit 6 an T/M output shaft rotational signal indicative of the detected rotational speed.

An inclinometer 4 is provided to measure an inclined angle of a vehicle with respect to the forward and backward direction and to send to the control unit 6 an incline signal indicative of the inclined angle (road surface gradient). A payload meter 5 measures a weight of a load carried on the vehicle on the basis of a hydraulic pressure of a suspension cylinder which carries the vehicle and applies to the control unit 6 a load signal indicative of the load weight.

The automatic transmission control unit 6 normally activates a speed switching solenoid valve 7 on the basis of the T/M output shaft rotational signal so that the transmission 8 is at the optimum speed stage. That is, at the time of starting the vehicle, the control unit 6 determines the optimum speed in accordance with the load condition and controls to cause the solenoid valve 7 to be actuated so that the transmission 8 is at the determined speed stage.

The automatic transmission control unit 6 includes speed modifier means or a speed modifier which functions to check an acceleration condition of the vehicle after starting the vehicle with the selected optimum speed stage after each predetermined acceleration has been set in correspondence with each speed stage. When the acceleration of the vehicle does not exceed the predetermined level set in correspondence with the selected optimum speed stage, the speed modifier checks a change in gradient on the basis of an output of the inclinometer. When a checked gradient change exceeds a predetermined angle, the speed modifier shifts down the speed stage of the transmission by one stage from the optimum stage selected in the start mode by the transmission lever 1.

Figure 2:
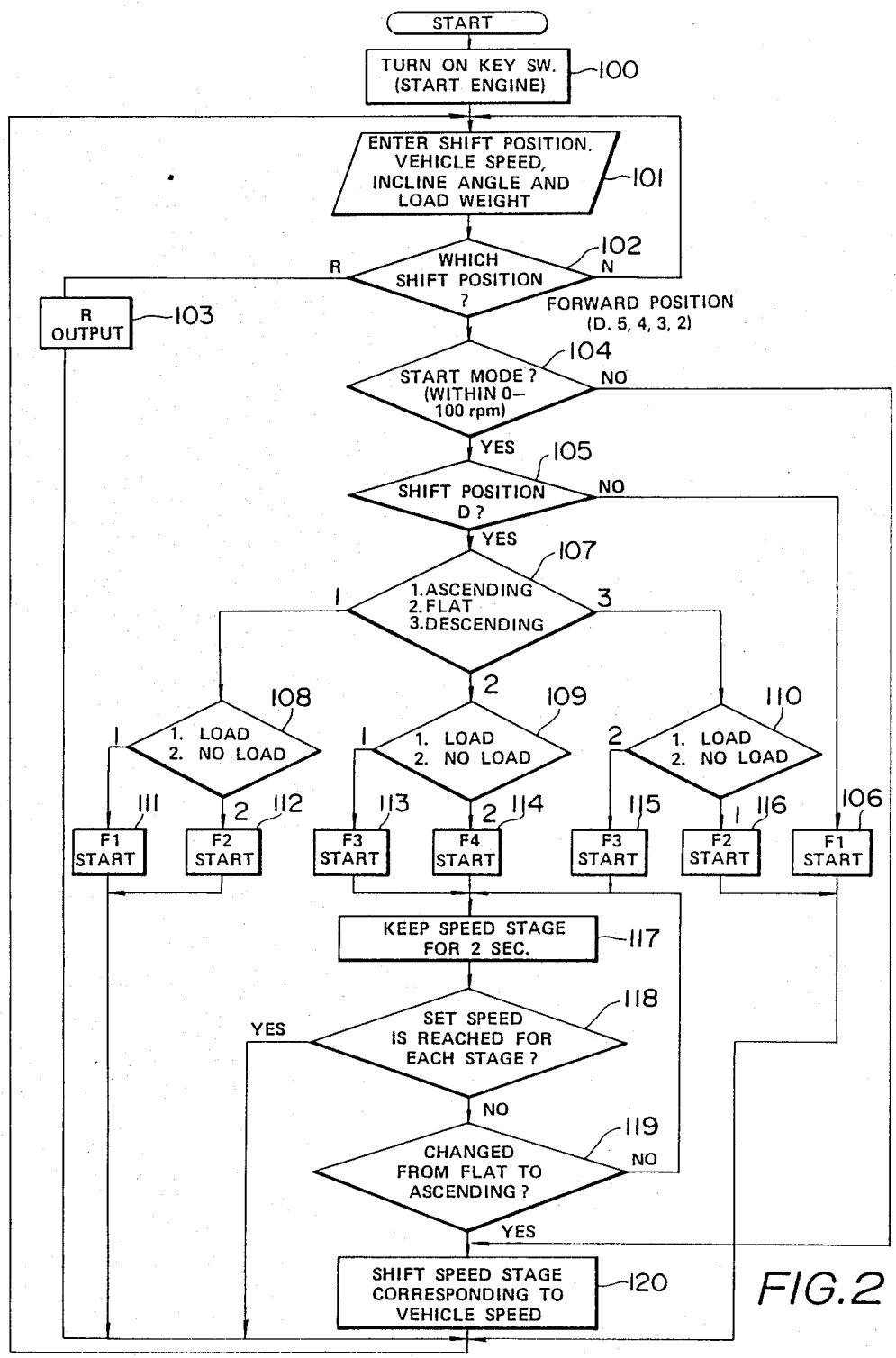
FIG. 2 is a flowchart for explaining the operation of the transmission control system of FIG. 1.

The operation of the automatic transmission control unit 6 will next be explained with reference to a flowchart shown in FIG. 2.

First, when a key switch is turned ON and the engine starts (step 100), the control unit 6 receives the position signal from the shift position sensor 2, the T/M output shaft rotational signal from the rotation sensor 3, the incline signal from the inclinometer 4 and the load signal from the payload meter 5 to input therein the vehicle speed, the inclined angle and the load weight (step 101).

Then the contol unit judges whether the input shift position corresponds to the neutral position N, the rear position R or the forward position (D, 5, 4, 3 or 2). If the judgment is the neutral position N then the control unit returns its control back to the step 101, if it is the rear position R then the control unit issues a command to order the operator to set the accelerator lever at the position R (step 103), and if it is the forward position then the control proceeds to a step 104. A relation between the shift positions and shift speed stages is shown in Table 1 below.

SPEED STAGES; SHIFT POSITIONS

That is, the automatic transmission control unit 6 automtically determines an automatic shift range of speed stages on the basis of the position signal indicative of one shift position. As seen from Table 1, automatic transmission or speed shift is effected so that automatic shift ranges F2-F7, F1-F5, F1-F4, F1-F3 and F1-F2 are set for the shift positions D, 5, 4, 3 and 2, respectively. For the shift positions R and N, on the other hand, no automatic speed shift is made and the respective speed stages are set as shown in Table 1.

At the step 104, the control unit judges whether or not the vehicle is in the start mode, on the basis of the speed of the vehicle, i.e., the rotational speed of the T/M output shaft. It is supposed that when the detected rotational speed is within a range of 0 to 100 rpm, the control unit judges that the vehicle is in the start mode. If the control unit judges at the step 104 to be in the start mode, then the unit judges whether or not the shift position is the drive position D (step 105). When the shift position is one of the forward positions (5, 4, 3 and 2) other than the drive position D, the control unit issues a speed shift command to start the vehicle from the speed F1 (step 106), while when the shift position is the drive position D, the control goes to a step 107.

The control unit determines at the step 107, on the basis of the input inclined angle, whether the road surface gradient indicates ascending 1, flat 2 or descending 3. If the control unit judges to be the ascending 1 then it proceeds to a step 108, if the unit judges to be the flat 2 then it proceeds to a step 109, and if it is the descending 3 then it proceeds to a step 110. In the judgment, the ascending 1 is defined as corresponding to the incline angle of more than 2 degrees, the descending 3 is to the inclined angle of less than −2 degrees and the flat 1 is to the inclined angle of between −2 and 2 degrees.

At the steps 108, 109 and 110, the control unit judges, on the basis of the load weight, whether the vehicle is loaded (load condition 1) or not loaded (no load condition 2). At the step 108, if the control unit judges to be the load condition 1 then it issues an F1 start command (step 111), while if it judges to be the no load condition 2 then it issues an F2 start command (step 112). At the step 109, when the judgment is the load condition 1 the control unit issues and F3 start command (step 113), while when it is the no load contion 2 it issues an F4 start command (step 114). Further, at the step 110, the judgment of the load condition 1 causes the control unit to issue an F2 start command (step 116) while the judgment of the no load condition causes the unit to issue the F3 start command (step 115). In such judgment, the load condition is defined as the load weight not less than 20% of the full load weight and the no load condition is as the load weight smaller than 20% of the full weight.

Next, in the case of the F3 or F4 start at the steps 113 to 115, the control unit checks the acceleration condition after the start of the vehicle. If the acceleration does not exceed a predetermined level, then the the control unit orders the vehicle to shift down. More specifically, the control unit controls to maintain the vehicle at the starting speed stage for 2 seconds and after passage of 2 seconds, the unit judges whether or not the vehicle speed reached associated one of 2-second-later speed levels previously set for the respective starting speed stages (step 118). If not (if the vehicle acceleration does not exceed the set speed level), then the control unit judges, on the basis of an output of the inclinometer 4, whether or not there was a gradient change from the flat to the ascending (step 119). When there was such a gradient change, the control goes to a step 120.

Figure 3:
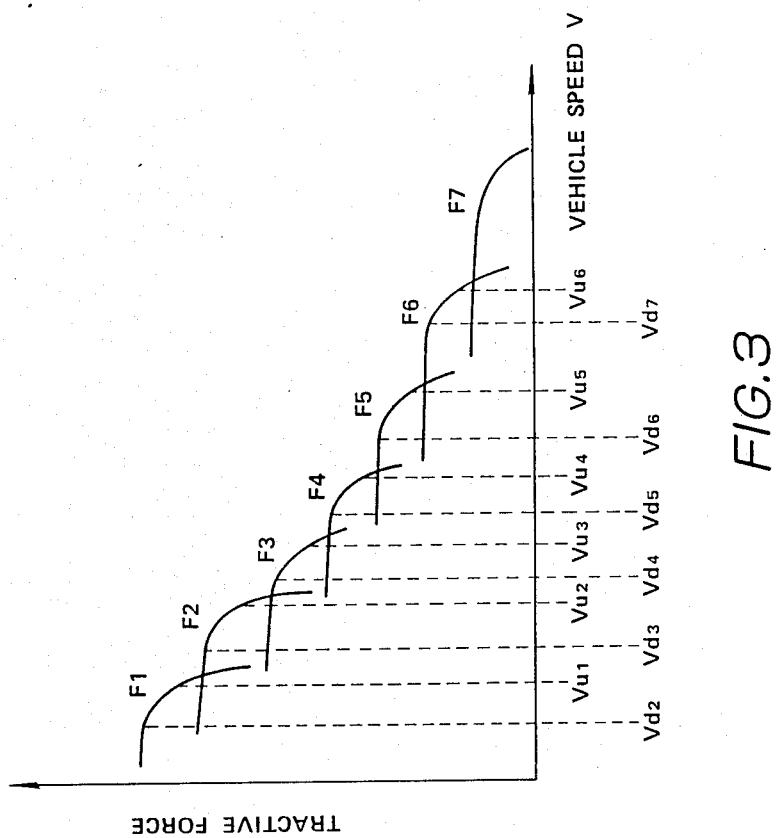
FIG. 3 is a diagram for explaining an example of normal automatic transmission control.

At the step 120, when the vehicle speed is within an allowable range at the current speed stage, the control unit controls to maintain the current speed stage. If the speed exceeds the allowable range, then the control unit shift up or down by one stage. For example, in the case where speed stages are previously set respectively for different vehicle speeds V as shown in FIG. 3, when the vehicle speed exceeds associated one of upper limits Vui (i=1 to 6) of the speed stages, the speed stage is shifted up to the next higher stage, whereas when the speed does not exceed the associated upper limit, the speed stage is shifted down to the next lower stage.

The foregoing explanation about how to select the optimum speed stage at the time of starting the vehicle has been made in connection with the illustrated embodiment, but the present invention is not limited to the particular one and may be modified in various ways so long as the speed stage at the start time can be selected to provide the vehicle to predetermined start/acceleration characteristics in accordance with the load conditions (such as load weight, road surface gradient, and so on) of the vehicle.

Figure 4:
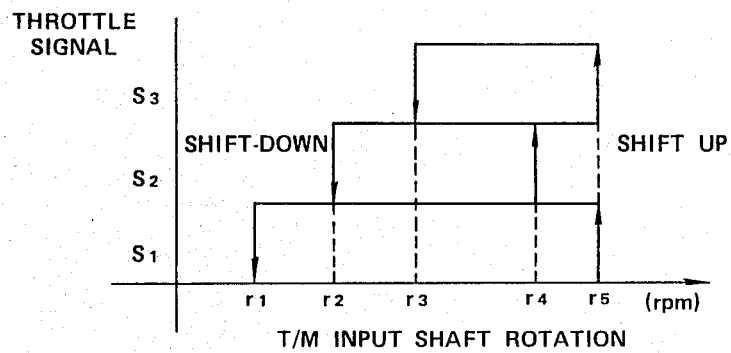
FIGS. 4 and 5 are explanatory diagrams for explaining another example of the automatic transmission control.
Figure 5:
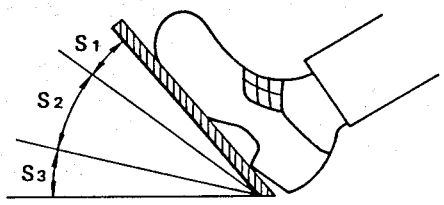

Further, although the speed stage has been selected in accordance with the vehicle speed (T/M output shaft rotational speed) in the present embodiment, the present invention is not restricted to the particular one and may be modified in various ways. For example, the speed may be changed according to such a pattern as shown in FIG. 4 on the basis of, e.g., a throttle signal indicative of the T/M input shaft rotation (or engine rotation) and an amount of depression in the accelerator pedal. In this connection, in the case where the throttle signal has a level of, for example, $S_2$ (refer to FIG. 5), if the T/M input shaft rotation exceeds r4 then the speed is shifted up by one stage, while if the rotation drops down to r2 then the speed is shifted down by one stage. (Industrial Applicability)

As has been disclosed in the foregoing, in accordance with the present invention, a starting speed stage selector in an automatic transmission control system is effectively used for such a vehicle as a dump truck requiring automatic shift-up or shift-down control of speed stages in a transmission by one stage according to the load conditions of the vehicle.

We claim:

1. In an automatic transmission system in which a speed of a transmission having speed stages is sequentially shifted up or down on a step-by-step basis in response to load conditions of a vehicle to change said transmission at an optimum one of said speed stages; a starting speed stage selector comprising:

means for detecting a start mode of the vehicle;

means for detecting the load conditions of the vehicle;

means for detecting an inclined angle of the vehicle with respect to a front and rear direction;

means for selecting an optimum one of said speed stages in the start mode of the vehicle on the basis of outputs of said load condition detecting means and said inclined angle detecting means;

speed control means for controllably changing the speed stage of said transmission to the optimum speed selected by said starting-speed-stage selecting means in the start mode of the vehicle when said start mode detecting means detects the start mode;

setting means for setting predetermined accelerations each corresponding to each speed stage; and speed modifier means for checking an acceleration condition of the vehicle after starting the vehicle with the selected optimum speed stage, checking a change in gradient on the basis of an output of said inclined angle detecting means when the acceleration of the vehicle does not exceed the predetermined acceleration corresponding to the selected optimum speed stage, and shifting down the speed stage of said transmission by one stage from the optimum speed stage selected in the start mode by said starting speed stage selecting means when a checked gradient change exceeds a predetermined angle.

2. A starting speed stage selector as set forth in claim 1, wherein said start mode detecting means judges whether or not said vehicle is in the start mode on the basis of a rotational speed of an output shaft of said transmission.

3. A starting speed stage selector as set forth in claim 2, wherein said start mode detecting means judges that said vehicle is in the start mode when the output shaft rotational speed of said transmission is in a range of from 0 to 100 rpm.

4. A starting speed stage selector as set forth in claim 1, wherein said starting speed stage selecting means judges on the basis of an output of said inclined-angle detecting means whether a road surface gradient indicates an ascending, flat or descending road and on the basis of the judgment result, selects said optimum speed stage in the start mode of the vehicle.

5. A starting speed stage selector as set forth in claim 4, wherein said starting speed stage selecting means judges to be the ascending, descending and flat roads when the inclined angle detected by said inclined-angle detecting means is more than 2 degrees, less than −2 degrees and between −2 and 2 degrees, respectively.

6. A starting speed stage selector as set forth in claim 1, wherein said load condition detecting means determines the load weight on the basis of a hydraulic pressure of a suspension cylinder for carriage of the vehicle and on the basis of the determined weight, and applies to said starting speed stage selecting means a signal indicative of either one of load and no load conditions.

7. A starting speed stage selector as set forth in claim 6, wherein said load condition detecting means judges to be the load condition when the load weight is 20% or more of a full load weight and to be the no load condition when the load weight is not exceed 20% of said full load weight.

8. A starting speed stage selector as set forth in claim 1, wherein said speed control means, in the start mode, changes the current speed stage of said transmission, when a shift position is a drive position, to optimum one of the speed stages of the transmission selected by said starting speed stage selecting means, and changes, when said shift position is one other than said drive position, to associated one of preset speed speed stages.

9. A starting speed stage selector as set forth in claim 1, wherein said speed control means, after changing the speed stage of said transmission to one of said transmission speed stages optimum for the start mode by said starting speed stage selecting means, shifts up or down the transmission speed stage on a step-by-step basis in accordance with a speed of the vehicle.

10. A starting speed stage selector as set forth in claim 9, wherein said speed control means sets an allowable range of the vehicle speed having upper and lower limits set for each of said speed stages, and shifts up the speed stage of said transmission by one stage when the vehicle speed exceeds said upper limit of the associated speed stage, while shifts down by one stage when the vehicle speed does not exceed said lower limit of the associated speed stage.

11. A starting speed stage selector as set forth in claim 9 or 10, wherein said speed control means judges the vehicle speed on the basis of the rotation of the output shaft of said transmission.

12. A starting speed stage selector as set forth in claim 1, wherein said speed control means, after changing the speed stage of said transmission to one of said transmission speed stages optimum for the start mode by said starting speed stage selecting means, shifts up or down the transmission speed stage on a step-by-step basis in accordance with rotation of the input shaft of the transmission and an amount of accelerator pedal depressed.

13. A starting speed stage selector as set forth in claim 1, wherein said speed control means, after changing the speed stage of said transmission to one of said transmission speed stages optimum for the start mode by said starting speed stage selecting means, shifts up or down the transmission speed stage on a step-by-step basis in accordance with a rotational speed of an engine and an amount of depression in an accelerator pedal.

14. In an automatic transmission system in which a speed of a transmission having speed stages is sequentially shifted up or down on a step-by-step basis in response to load conditions of a vehicle to change said transmission at optimum one of said speed stages; a starting speed stage selector comprising:

means for detecting a start mode of the vehicle;

means for detecting the load conditions of the vehicle;

means for detecting an inclined angle of the vehicle with respect to a front and rear direction;

means for selecting an optimum one of said speed stages in the start mode of the vehicle on the basis of outputs of said load condition detecting means and said inclined angle detecting means;

speed control means for controllably changing the speed stage of said transmission to the optimum speed selected by said starting-speed-stage selecting means in the start mode of the vehicle when said start mode detecting means detects the start mode;

acceleration detecting means for detecting an acceleration of the vehicle;

setting means for setting predetermined accelerations each corresponding to each speed stage;

first comparing means for comparing an output of said acceleration detecting means with said predetermined acceleration of said setting means corresponding to said selected optimum speed stage after starting the vehicle with said selected optimum speed stage;

gradient change checking means for checking a change in gradient on the basis of an output of said inclined angle detecting means when the acceleration is detected not exceeding the predetermined acceleration on the basis of a compared result of said first comparing means;

second comparing means for comparing a detected value of said gradient change checking means with a predetermined value; and speed modifier means for shifting down the speed stage of said transmission by one stage from the optimum speed stage selected in the start mode by said starting speed stage selecting means on the basis of a compared result of said second comparing means when a checked gradient exceeds a predetermined angle.

15. In an automatic transmission system in which a speed of a transmission having speed stages is sequentially shifted up or down on a step-by-step basis in response to load conditions of a vehicle to change said transmission at optimum one of said speed stages; a starting speed stage selector comprising:

means for detecting a start mode of the vehicle;

means for detecting the load conditions of the vehicle;

means for detecting an inclined angle of the vehicle with respect to a front and rear direction;

means for selecting an optimum one of said speed stages in the start mode of the vehicle on the basis of outputs of said load condition detecting means and said inclined angle detecting means;

speed control means for controllably changing the speed stage of said transmission to the optimum speed selected by said starting-speed-stage selecting means in the start mode of the vehicle when said start mode detecting means detects the start mode;

speed detecting means for detecting a speed of the vehicle;

setting means for setting predetermined accelerations each corresponding to each speed stage; and speed modifier means for determining a speed of the vehicle at a moment after a certain period of time from the starting time of the vehicle started with said selected optimum speed stage, checking a change in gradient on the basis of an output of said inclined angle detecting means when the determined speed does not exceed the predetermined speed corresponding to said selected optimum speed stage, and shifting down the speed stage of said transmission by one stage from the optimum stage selected in the start mode by said starting speed selecting means when a checked gradient change exceeds a predetermined angle.

* * * * *